(12) United States Patent
Cassidy et al.

(10) Patent No.: US 7,994,099 B2
(45) Date of Patent: Aug. 9, 2011

(54) CORROSION INHIBITOR COMPOSITIONS COMPRISING AN ALDEHYDE AND A THIOL AND/OR AN AMINE FUNCTIONALIZED RING STRUCTURE AND ASSOCIATED METHODS

(75) Inventors: Juanita M. Cassidy, Duncan, OK (US); Chad E. Kiser, Comanche, OK (US); Jim L. Lane, Duncan, OK (US)

(73) Assignee: Haliburton Energy Services, Inc., Duncan, OK (US)

( * ) Notice: Subject to any disclaimer, the term of this patent is extended or adjusted under 35 U.S.C. 154(b) by 196 days.

(21) Appl. No.: 12/386,094

(22) Filed: Apr. 14, 2009

(65) Prior Publication Data

US 2010/0261623 A1    Oct. 14, 2010

(51) Int. Cl.
*C09K 8/60* (2006.01)
(52) U.S. Cl. .......... 507/90; 507/237; 507/263; 507/266; 507/267; 507/268
(58) Field of Classification Search .............. None
See application file for complete search history.

(56) References Cited

U.S. PATENT DOCUMENTS

| | | | |
|---|---|---|---|
| 2,605,223 A | 7/1952 | Case et al. | |
| 2,850,453 A | 9/1958 | Fields | |
| 3,094,490 A | 6/1963 | Gardner et al. | |
| 3,096,294 A | 7/1963 | Hughes | |
| 3,416,974 A * | 12/1968 | Scott | 148/250 |
| 3,585,069 A | 6/1971 | Owsley et al. | |
| 3,664,807 A * | 5/1972 | Redmore | 422/7 |
| 3,887,488 A * | 6/1975 | Scott et al. | 252/389.2 |
| 3,932,296 A | 1/1976 | Byth | |
| 4,186,157 A * | 1/1980 | Ripple | 558/108 |
| 4,446,056 A * | 5/1984 | Thompson | 252/391 |
| 4,493,775 A | 1/1985 | Coffey et al. | |
| 4,522,658 A * | 6/1985 | Walker | 148/248 |
| 4,631,138 A * | 12/1986 | Johns et al. | 507/243 |
| 4,640,786 A * | 2/1987 | Soderquist et al. | 507/237 |
| 4,676,834 A | 6/1987 | Treybig | |
| 4,734,259 A | 3/1988 | Frenier et al. | |
| 4,871,848 A | 10/1989 | Treybig et al. | |
| 4,925,580 A * | 5/1990 | Camenzind | 508/274 |
| 4,978,512 A | 12/1990 | Dillon | |
| 5,366,643 A | 11/1994 | Walker | |
| 5,591,381 A | 1/1997 | Walker | |
| 5,697,443 A | 12/1997 | Brezinski et al. | |
| 5,821,202 A * | 10/1998 | Forester et al. | 507/90 |
| 6,117,364 A | 9/2000 | Vorderbruggen et al. | |
| 6,180,057 B1 | 1/2001 | Taylor et al. | |
| 6,192,987 B1 | 2/2001 | Funkhouser et al. | |
| 6,399,547 B1 * | 6/2002 | Frenier et al. | 507/268 |
| 7,216,710 B2 | 5/2007 | Welton et al. | |
| 2005/0123437 A1 | 6/2005 | Cassidy et al. | |
| 2005/0169794 A1 | 8/2005 | Welton et al. | |
| 2008/0139414 A1 | 6/2008 | Cassidy et al. | |

FOREIGN PATENT DOCUMENTS

| EP | 593230 A1 * | 4/1994 |
|---|---|---|
| GB | 1434354 | 5/1976 |

OTHER PUBLICATIONS

Ashry et al., Corrosion Inhibitors Part 3: Quantum Chemical Studies on the Efficiencies of Some Aromatic Hydrazides and Schiff Bases as Corrosion Inhibitors of Steel in Acidic Medium, ARKIVOC 2006, pp. 205-220.
Ashry et al., Corrosion Inhibitors Part 3: Quantum Chemical Studies on the Efficiencies of Some Aromatic Hydrazides and Schiff Bases as Corrosion Inhibitors of Steel in Acidic Medium, ARKIVOC 2006 (xi), pp. 205-220, XP-002590996.
International Search Report and Written Opinion for patent application PCT/GB2009/002889 dated Jul. 22, 2010.

* cited by examiner

*Primary Examiner* — John J Figueroa
(74) *Attorney, Agent, or Firm* — Robert A. Kent; McDermott Will & Emery LLP

(57) ABSTRACT

Provided herein are methods and compositions that include a method comprising contacting a metal surface with an acidic fluid comprising a corrosion inhibitor that comprises a reaction product formed from a direct or an indirect reaction of an aldehyde with a thiol and/or an amine functionalized ring structure. A composition provided includes an acidic treatment fluid that comprises an aqueous-base fluid, and acid, and a corrosion inhibitor that comprises a reaction product formed from a direct or an indirect reaction of an aldehyde with a thiol and/or an amine functionalized ring structure.

19 Claims, No Drawings

CORROSION INHIBITOR COMPOSITIONS COMPRISING AN ALDEHYDE AND A THIOL AND/OR AN AMINE FUNCTIONALIZED RING STRUCTURE AND ASSOCIATED METHODS

BACKGROUND

The present invention relates generally to corrosion inhibitors, and more particularly, at least in some embodiments, to corrosion inhibitors comprising reaction products of an aldehyde with a thiol and/or an amine functionalized ring structures, and methods of using such inhibitors in subterranean applications.

Metals such as carbon steel alloys, copper alloys, chrome alloys, and nickel alloys are commonly used in subterranean application equipment (such as in drilling pipes and mixing tanks) and installations (such as gravel pack screens, tubing, and casings). Oftentimes, these metals are subjected to corrosive fluids during subterranean operations.

One such corrosive fluid is an acidizing fluid. Subterranean hydrocarbon-containing formations penetrated by well bores are commonly treated with aqueous acid solutions to stimulate the production of hydrocarbons therefrom. One such treatment known as "acidizing" involves the introduction of an aqueous acid solution into the subterranean formation under pressure so that the acid solution flows through the pore spaces of the formation. The acid solution reacts with acid soluble materials contained in the formation thereby increasing the size of the pore spaces and the permeability of the formation. Another production stimulation treatment known as "fracture-acidizing" involves the formation of one or more fractures in the formation and the introduction of an aqueous acid solution into the fractures to etch the fracture faces whereby flow channels are formed when the fractures close. The aqueous acid solution also enlarges the pore spaces in the fracture faces in the formation. Some commonly used acids include hydrochloric acid, hydrofluoric acid, acetic acid, formic acid, citric acid, ethylene diamine tetra acetic acid ("EDTA"), and combinations thereof.

In carrying out acidizing and fracture-acidizing treatments in wells and other similar treatments using aqueous acid solutions, the corrosion of metal tubular goods, pumps, and other equipment is often a problem. The expense associated with repairing or replacing corrosion damaged metal tubular goods and equipment can be very high. In a well treatment utilizing an aqueous acid solution, the corrosion of metal surfaces in tubular goods and equipment results in at least the partial neutralization of the aqueous acid solution before it reacts with acid-soluble materials in the subterranean formation to be treated. Also, the presence of dissolved metals in the aqueous acid solution can bring about the precipitation of insoluble sludge when the aqueous acid solution contacts crude oil which can in turn severely damage the permeability of the subterranean formation being treated.

A variety of metal corrosion inhibiting formulations for use in aqueous acid solutions have been developed and used. Many of such corrosion inhibiting formulations have included quaternary ammonium compounds as essential components, particularly in high temperature applications. However, problems have been associated with the use of quaternary ammonium compounds in that they are generally highly toxic to aquatic organisms. Further, the quaternary ammonium compounds that achieve high degrees of metal corrosion protection at high temperatures are those that have relatively high molecular weights and high degrees of aromaticity. Those quaternary ammonium compounds are not readily available commercially and are very expensive to produce. Subterranean applications now require alloys of increasing corrosion resistance and strength. These increasing demands arise from factors including: deep wells that involve higher temperatures and pressures; enhanced recovery methods such as steam or carbon dioxide ($CO_2$) injection; increased tube stresses especially offshore; and corrosive well constituents including: hydrogen sulfide ($H_2S$), $CO_2$ and chlorides. Materials selection is especially critical for sour conditions, which are those having $H_2S$ present. Sour well environments are highly toxic and extremely corrosive to traditional carbon steel oil and gas alloys. In some sour environments, corrosion can be controlled by using inhibitors along with carbon steel tubulars. The inhibitors, however, involve continuing high cost and are often unreliable at high temperatures. Additionally, conventional inhibitors are generally not effective in sour conditions because the organic portion of the inhibitor is believed to react with the $H_2S$, which decreases the performance of the inhibitor. Furthermore, in sour conditions, copper and antimony-based intensifiers will precipitate out of solution.

SUMMARY

The present invention relates generally to corrosion inhibitors, and more particularly, at least in some embodiments, to corrosion inhibitors comprising reaction products of an aldehyde with a thiol and/or an amine functionalized ring structure, and methods of using such inhibitors in subterranean applications.

In one embodiment, the present invention provides a method comprising: contacting a metal surface with an acidic fluid comprising a corrosion inhibitor that comprises a reaction product formed from a direct or an indirect reaction of an aldehyde with a thiol and/or an amine functionalized ring structure.

In one embodiment, the present invention provides a method comprising: introducing an acidic fluid into a well bore penetrating a subterranean formation, wherein the acidic fluid comprises an aqueous-base fluid, an acid, and a corrosion inhibitor that comprises a reaction product formed from a direct or an indirect reaction of an aldehyde with a thiol and/or an amine functionalized ring structure.

In one embodiment, the present invention provides a method comprising: providing an acidic fluid comprising an aqueous-base fluid, an acid, and a corrosion inhibitor that comprises a reaction product formed from a direct or an indirect reaction of an aldehyde with a thiol and/or an amine functionalized ring structure; and placing the acidic fluid in a well bore penetrating a subterranean formation.

In one embodiment, the present invention provides an acidic treatment fluid comprising: an aqueous-base fluid; an acid; and a corrosion inhibitor that comprises a reaction product formed from a direct or an indirect reaction of an aldehyde with a thiol and/or an amine functionalized ring structure.

In one embodiment, the present invention provides a corrosion inhibitor composition comprising a reaction product formed from a direct or an indirect reaction of an aldehyde with a thiol and/or an amine functionalized ring structure.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates generally to corrosion inhibitors, and more particularly, at least in some embodiments, to corrosion inhibitors comprising reaction products of an aldehyde with a thiol- and/or an amine-functionalized ring structure, and methods of using such inhibitors in subterranean applications. In certain embodiments, the corrosion inhibitor may comprise a reaction product of an aldehyde with a dithiol and/or a diamine functionalized ring structure. This combination results in an unexpected improvement in corrosion inhibition over conventional molecules, specifically monoamine and monothiol compounds and amines and thiols that are not part of ringed structures.

One of the many advantages of the present invention (many of which are not alluded to herein) is that the corrosion inhibitor compositions of the present invention may be more effective than corrosion inhibitors heretofore used and/or may possess desirable performance when used in sour conditions. Another potential advantage of the corrosion inhibitor compositions of the present invention is that they may be more effective according to time and temperature over other inhibitors. It is believed that larger, aromatic molecules tend to perform better as corrosion inhibitors. The corrosion inhibitors of the present invention are believed to be good corrosion inhibitors due to at least in part their organic structure. Additionally, with the corrosion inhibitor compositions of the present invention, when cinnamaldehyde or other inhibiting aldehydes are used, performance improvements may be achieved. With acid pumping companies being pushed toward the weaker-performing, but more environmentally-friendly, corrosion inhibitors, as cinnamaldehyde is generally perceived, any improvement in performance that preserves the environmental attributes is usually viewed as a great advantage.

The corrosion inhibitors of the present invention comprise a reaction product formed from a direct or an indirect reaction of an aldehyde with a thiol and/or an amine functionalized ring structure. In some embodiments, the reaction product may be the reaction product formed from a direct or an indirect reaction of a aldehyde with a dithiol and/or a diamine. In some embodiments, the aldehyde and amine or thiol functionalized ringed compound are pre-reacted before addition to a treatment fluid. An example of an indirect reaction may be an instance where a cinnamaldehyde undergoes radical initiated polymerization on the surface of a metal object and then reacts with a thiol and/or an amine functionalized ring structure. A direct reaction of these components may result in a structure similar to the following structures, which illustrate reaction products from a 2:1 ratio of aldehyde to thiol or amine.

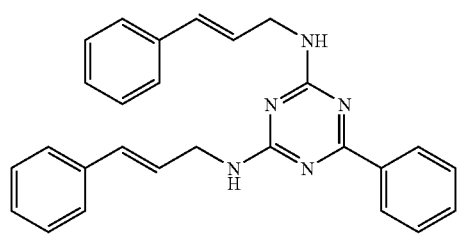

Cinnamaldehyde + 2,4-Diamino-6-phenyl-1,3,5-triazine

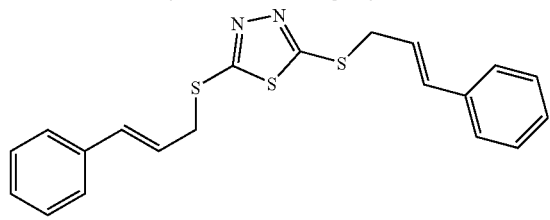

Cinnamaldehyde + 2,5-Dimercapto-1,3,4-thiadiazole

-continued

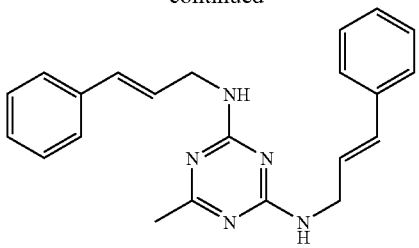

Cinnamaldehyde + 2,4-Diamino-6-methyl-1,3,5-triazine

Aldehyde compounds suitable for use in the corrosion inhibitors of the present invention include α,β-unsaturated aldehydes having the general formula:

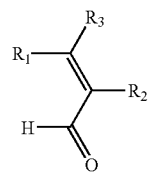

wherein: $R_1$ represents: hydrogen; a saturated or unsaturated aliphatic hydrocarbon group containing from about 3 to about 12 carbon atoms; a substituted saturated or unsaturated aliphatic hydrocarbon group containing from about 3 to about 12 carbon atoms and containing one or more non-interfering substituents; an aryl group, e.g., phenyl, benzyl or the like; a substituted aryl group containing one or more non-interfering substituents; or, a non-interfering substituent per se. $R_2$ represents: hydrogen; a saturated or unsaturated aliphatic hydrocarbon group containing from 1 to about 5 carbon atoms; a substituted saturated aliphatic hydrocarbon group containing from 1 to about 5 carbon atoms and containing one or more noninterfering substituents; an aryl group; a substituted aryl group containing one or more non-interfering substituents; or, a non-interfering substituent per se. $R_3$ represents: hydrogen; a saturated or unsaturated aliphatic hydrocarbon group containing from about 3 to about 12 carbon atoms; a substituted saturated or unsaturated aliphatic hydrocarbon group containing from about 3 to about 12 carbon atoms and containing one or more non-interfering substituents; an aryl group; a substituted aryl group containing one or more non-interfering substituents; or, a non-interfering substituent per se. The total number of carbon atoms in substituents represented by $R_1$, $R_2$ and $R_3$ range from 1 to about 16, preferably from 5 to 10. The "non-interfering substituents" referred to above are those substituents that have no adverse effect on the corrosion inhibition. They include, for example, lower alkyl (containing from 1 to about 4 carbon atoms), lower alkoxy (containing from 1 to about 4 carbon atoms), halo (e.g., fluoro, chloro, bromo or iodo), hydroxyl, dialkylamino, cyano, thiocyano, N,N-dialkylcarbamoylthio and nitro substituents.

Another aldehyde compound suitable for use in the corrosion inhibitors of the present invention is 2-hydroxynapthaldehyde having the general formula:

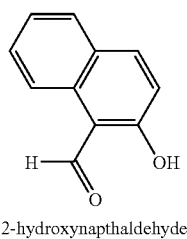

2-hydroxynapthaldehyde

Examples of cinnamaldehydes and its derivatives suitable for use in the corrosion inhibitors of the present invention include, but are not limited to, 7-phenyl-2,4,6-heptatrienal, crotonaldehyde, 2-hexenal, 2-heptenal, 2-octenal, 2-nonenal, 2-decenal, 2-undecenal, 2-dodecenal, 2,4-hexadienal, 2,4-heptadienal, 2,4-octadienal, 2,4-nonadienal, 2,4-decadienal, 2,4-undecadienal, 2,4-dodecadienal, 2,6-dodecadienal, citral, 1-formyl-[2-(2-methylvinyl)]-2-n-octylethylene, cinnamaldehyde, dicinnamaldehyde, p-hydroxycinnamaldehyde, p-methylcinnamaldehyde, p-ethylcinnamaldehyde, p-methoxycinnamaldehyde, p-dimethylaminocinnamaldehyde, p-diethylaminocinnamaldehyde, p-nitrocinnamaldehyde, o-nitrocinnamaldehyde, o-allyloxycinnamaldehyde, 4-(3-propenal)cinnamaldehyde, p-sodium sulfocinnamaldehyde, p-trimethylammoniumcinnamaldehyde sulfate, p-trimethylammoniumcinnamaldehyde o-methylsulfate, p-thiocyanocinnamaldehyde, p-(S-acetyl)thiocinnamaldehyde, p-(S—N,N-dimethylcarbamoylthio)cinnamaldehyde, p-chlorocinnamaldehyde, 5-phenyl-2,4-pentadienal, 5-(p-methoxyphenyl)-2,4-pentadienal, 2,3-diphenylacrolein, 3,3-diphenylacrolein, α-methylcinnamaldehyde, β-methylcinnamaldehyde, α-chlorocinnamaldehyde, α-bromocinnamaldehyde, α-butylcinnamaldehyde, α-amylcinnamaldehyde, α-hexylcinnamaldehyde, 2-(p-methylbenzylidine)decanal, α-bromo-p-cyanocinnamaldehyde, α-ethyl-p-methylcinnamaldehyde, p-methyl-α-pentylcinnamaldehyde, 3,4-dimethoxy-α-methylcinnamaldehyde, α-[(4-methylphenyl)methylene]benzeneacetaldehyde, α-(hydroxymethylene)-4-methylbenzylacetaldehyde, 4-chloro-α-(hydroxymethylene)benzeneacetaldehyde, α-nonylidenebenzeneacetaldehyde, mixtures thereof, and the like.

Thiol compounds suitable for use in the corrosion inhibitors of the present invention include thiols, dithiols, and their derivatives. Dithiols are hereby defined to include thiols having at least two thiol groups and their derivatives. Examples of suitable thiol compounds may include, but are not limited to, 2,5-dimercapto-1,3,4-thiadiazole, dipotassium 2,5-dimercapto-1,3,4-thiadiazole salt, 1,3-benzenedithiol, and any combinations thereof. In certain embodiments of the reaction product, at least two thiol groups are functionalized to a 4, 5, or 6-membered ring comprising heteroatoms of N, S, O. In another embodiment, the thiol functionalized ring may be and may be preferred to be aromatic.

Amine compounds suitable for use in the corrosion inhibitors of the present invention include amines, diamines, and their derivatives. Diamines are hereby defined to include amines having at least two primary or secondary amine groups and their derivatives. Examples of suitable diamines may include, but are not limited to, 3,4-diaminofuran, 2,4-diamino-6-phenyl-1,3,5-triazine, 2,4-diamino-6-methyl-1,3,5-triazine, 2,4-diamino-6-hydroxy-1,3,5-triazine, 2,4-diamino-6-chloro-1,3,5-triazine, 2,5-diaminotoluene, 2,6-diaminopyridine, 2,6-diaminotoluene, 2,4-diaminotoluene, m-phenylenediamine, p-phenylenediamine, 4-methyl-m-phenylenediamine, 2,5-diaminotoluene sulfate, 2-methyl-1,3-benzenediamine, 5-chloro-1,3-phenylenediamine, 2,4,6-trimethyl-1,3-benzenediamine, 3,5-diaminobenzoic acid, 3-nitro-1,2-benzenediamine, 2-nitro-1,2-benzenediamine, 1,3-benzenediamine, 4-nitro-1,2-benzenediamine, 3-nitro-1,3-phenylenediamine, 2',4'-diaminoacetanilide, N-(3-aminophenyl)butanamide, 2,4-diaminobenzenesulfonic acid, 4-ethoxy-1,3-phenylenediamine 2HCl, 2,4-bis(butylamino)-3-oxo-1-cyclobutenylium-1-olate, 2,4-bis(3-benzamidopropylamino)-3-oxo-1-cyclobutenylium-1-olate, 4-imino-5-methyl-2-nitramino-4H-imidazole, 2,5-diacetamido-1,3,4-thiadiazole, 5-amino-1,3,3-trimethylcyclohexanemethylamine, and any combination thereof. In certain embodiments of the reaction product, at least two amine groups are functionalized to a 4, 5, or 6-membered aliphatic or aromatic ring comprising heteroatoms of N, S, O. In another embodiment, the amine functionalized ring may be and may be preferred to be aromatic.

The aqueous-base fluids used in the treatment fluids of the present invention may comprise fresh water, saltwater (e.g., water containing one or more salts dissolved therein), brine, seawater, or combinations thereof. In some instances, the aldehyde and amine or thiol functionalized ringed compound are pre-reacted before addition to a treatment fluid. In other embodiments, these components may be added to the treatment fluid in a manner so that they react in the fluid to form the reaction product. Generally, the water may be from any source, provided that it does not contain an excess of components that might undesirably affect the stability and/or performance of the treatment fluids. One of ordinary skill in the art, with the benefit of this disclosure, will recognize what components might undesirably affect the stability and/or performance of the treatment fluids of the present invention. In certain embodiments, the aqueous-base fluid may be emulsified into a nonaqueous fluid. The aqueous-base fluid may also be viscosified with an acid stable gelling agent, such as, for example, a polymer, which may also include a crosslinker. In certain embodiments, the aqueous-base fluid may also be foamed.

As set forth above, the corrosion inhibitor compositions of the present invention may be included in an acidic treatment fluid. Generally, the treatment fluids of the present invention may comprise an aqueous-base fluid, an acid, a corrosion inhibitor, and optionally a corrosion inhibitor intensifier composition. In some embodiments, the treatment fluid may comprise a gelled acid. Typical corrosion inhibitor intensifiers are formic acid, formaldehyde, hexamethylenetetramine, KI, NaI, Cu salts, Bi and Sb compounds. The corrosion inhibitor compositions of the present invention may be present in the treatment fluid in an amount in the range of about 0.005% to about 5% by volume of the treatment fluid. In some embodiments, the corrosion inhibitor composition may be present in an amount in the range of about 0.1% to about 2% by volume of the treatment fluid. The amount used may vary depending on conditions present at the metal's surface, temperature, contact time, solubility of the corrosion inhibitor compound in the acid present, the acid strength, the composition of the corrosion inhibitor compound, and other factors relevant to those skilled in the art.

The acid that may be present in the acidic treatment fluids of the present invention may include, but is not limited to, organic acids, mineral acids (such as hydrochloric acid, hydrofluoric acid, and the like), and mixtures of these acids. In certain embodiments, hydrochloric acid may be present in a range of about 5% to 28% by weight of the treatment fluid. Additionally, a variety of weak acids can be used in accordance with embodiments of the present invention. Examples of suitable weak acids include, but are not limited to, formic acid, acetic acid, citric acid, glycolic acid, hydroxyacetic acid, lactic acid, hydrofluoric acid, 3-hydroxypropionic acid, carbonic acid, ethylenediaminetetraacetic acid, and mixtures of these acids. The acid may be present in an amount in the range of about 1% to about 37% by weight of the treatment fluid. In certain embodiments, the acid may be present in an amount in the range of about 5% to about 28% by weight of the treatment fluid. The amount of the acid(s) included in a particular treatment fluid of the present invention may depend upon, for example, the desired purpose or use of the treatment fluid, the particular acid used, as well as other components of the treatment fluid, and/or other factors that will be recognized by one of ordinary skill in the art with the benefit of this disclosure.

The acidic treatment fluids of the present invention further may include a corrosion inhibitor. Any of a variety of corrosion inhibitors constituents may be suitable for use in the corrosion inhibitors in the compositions and methods of the present invention. Examples of suitable corrosion inhibitor constituents, include, but are not limited to, cinnamaldehyde compounds, quaternary ammonium compounds, acetylenic compounds, a condensation reaction product as set forth below, and combinations thereof. While the amount of corrosion inhibitor utilized in the practice of the present invention can vary over a substantial range, the corrosion inhibitor may present in an amount effective to inhibit corrosion by the acid on the metal surfaces to be protected. In certain embodiments, the corrosion inhibitor may be present in an amount of about 0.05% to about 3% by weight of the treatment fluid. Where used, the cinnamaldehyde compound may be present in an amount in the range of about 0.005% to about 5% by weight of the treatment fluid. In certain embodiments, cinnamaldehyde compound may be present in an amount in the range of about 0.02% to about 1% by weight of the treatment fluid.

In certain embodiments, the corrosion inhibitor compositions useful in the present invention may comprise an acetylenic compound. Acetylenic compounds suitable for use in the present invention may include acetylenic alcohols such as, for example, acetylenic compounds having the general formula: $R_7CCCR_8R_9OH$ wherein $R_7$, $R_9$, and $R_9$ are individually selected from the group consisting of hydrogen, alkyl, phenyl, substituted phenyl hydroxy-alkyl radicals. In certain embodiments, $R_7$ comprises hydrogen. In certain embodiments, $R_8$ comprises hydrogen, methyl, ethyl, or propyl radicals. In certain embodiments, $R_9$ comprises an alkyl radical having the general formula $C_nH_{2n}$, where n is an integer from 1 to 10. In certain embodiments, the acetylenic compound $R_7CCCR_8R_9OR_{10}$ may also be used where $R_{10}$ is a hydroxy-alkyl radical. Examples of acetylenic alcohols suitable for use in the present invention include, but are not limited to, methyl butynol, methyl pentynol, hexynol, ethyl octynol, propargyl alcohol, benzylbutynol, ethynylcyclohexanol, ethoxy acetylenics, propoxy acetylenics, and mixtures thereof. Examples of suitable alcohols include, but are not limited to, hexynol, propargyl alcohol, methyl butynol, ethyl octynol, propargyl alcohol ethoxylate (e.g., Golpanol PME), propargyl alcohol propoxylate (e.g., Golpanol PAP), and mixtures thereof. When used, the acetylenic compound may be present in an amount of about 0.01% to about 10% by weight of the treatment fluid. In certain embodiments, the acetylenic compound may be present in an amount of about 0.1% to about 1.5% by weight of the treatment fluid.

In certain embodiments, corrosion inhibitor compositions useful in the present invention may optionally comprise a condensation reaction product. As referred to herein, the condensation reaction product in this blend is hereby defined to include the reaction product of effective amounts of one or more active hydrogen containing compounds with one or more organic carbonyl compound having at least one hydrogen atom on the carbon atom alpha to the carbonyl group and a fatty acid or other fatty compound or alkyl nitrogen heterocycles and preferably 2 or 4 alkyl substituted and an aldehyde, and, in certain embodiments, those aldehydes that may comprise aliphatic aldehydes containing from 1 to 16 carbons and aromatic aldehydes having no functional groups that are reactive under the reaction conditions other than aldehydes. The above ingredients may be reacted in the presence of an acid catalyst of sufficient strength to thereby form the reaction product. These condensation reaction products are described in more detail in U.S. Pat. No. 5,366,643, the entire disclosures of which are hereby incorporated by reference. An example of one method of preparing the condensation reaction product may be to react about 1 equivalent of active hydrogen compound and about 0.5 to about 10 equivalents of aldehyde and about 0.6 to about 10 equivalents of carbonyl compound and about 0.8 to about 1.2 equivalents of mineral acid catalyst with about 0.15 to about 10 equivalents of fatty compound at a temperature in the range of about 140° F. to about 240° F. for a time in the range of about 4 to about 48 hours. Upon completion of the reaction, additional fatty material may be added with stirring to bring the ratio of fatty material to a level of about 2 to about 20 equivalents. In some embodiments, the condensation reaction product may be present in the range of about 3% to about 75% by weight of the corrosion inhibitor. In certain embodiments, the condensation reaction product may be present in an amount in the range of about 15% to about 30% by weight of the corrosion inhibitor.

In certain embodiments, combinations of the corrosion inhibitors disclosed herein, as well as additional corrosion inhibitor compounds and corrosion inhibitor intensifiers, may be used. Additional corrosion inhibitor components, such as solvents, surfactants, and other corrosion inhibitor intensifiers that may be suitable are further discussed in U.S. Pat. Nos. 5,697,443 and 5,591,381, the entire disclosures of which are hereby incorporated by reference.

The treatment fluids of the present invention optionally may include one or more of a variety of additives, such as salts, surfactants, solvents, scale inhibitors, organic corrosion inhibitors, catalysts, clay stabilizers, friction reducers, gases, foaming agents, iron control agents, solubilizers, pH adjusting agents (e.g., buffers), and the like. Combinations of these may be used as well. Those of ordinary skill in the art, with the benefit of this disclosure, will be able to determine the appropriate additives for a particular application.

The acidic treatment fluids of the present invention may be prepared using any of a variety of suitable techniques. For example, the acidic treatment fluids may be prepared by blending at least the aqueous-base fluid and the acid to provide an acidic treatment fluid of a desired acid concentration. The corrosion inhibitor may then be blended with the acidic treatment fluid in a desired amount. If desired, the treatment fluids of the present invention can be prepared in any suitable tank equipped with suitable mixing means. The treatment fluids may be transferred either at a controlled rate directly into a well bore or into a convenient storage tank for injection down a well bore, in accordance with embodiments of the present invention.

In some embodiments, the acidic treatment fluid may be introduced into a subterranean formation whereby either foreign material in the well bore or in the formation or formation materials are dissolved to thereby increase the permeability of the formation (e.g., in an acidizing treatment). The increased permeability generally should permit better flow of hydrocarbon fluids through the formation and into its well bore. The pumping rate and pressure utilized will depend upon, for example, the characteristics of the formation and whether or not fracturing of the formation is desired. After the treatment fluid has been placed in the formation, the well may be shut in and allowed to stand for a period of several hours or more depending on the type of acid employed and the formation treated. If there is pressure on the well, pressure then can be released and the spent or at least partially spent acidic treatment fluid, containing salts formed by the reaction of the acid, is permitted to flow back into the well bore and is pumped or flowed to the surface for appropriate disposal, in accordance with embodiments of the present invention. The well then may be placed on production or used for other purposes.

Generally, some of the methods of the present invention involve inhibiting the corrosion of a portion of a metal surface.

The methods of the present invention may be employed in a variety of applications, including those conducted in subterranean formations.

In one embodiment, the present invention provides a method comprising: contacting a metal surface with a treatment fluid comprising an aqueous-base fluid, an acid, and a corrosion inhibitor that comprises a reaction product formed from a direct or an indirect reaction of an aldehyde with a thiol and/or a amine functionalized ring structure. In some embodiments, the corrosion inhibitor comprises a reaction product formed from a direct or an indirect reaction of an aldehyde with a dithiol and/or a diamine functionalized ring structure.

The metals suitable for use with the corrosion inhibitor intensifier compounds of the present invention include ferrous-based metals such as iron and alloys of iron, for example, N-80, J-55, 13Cr and 22Cr, and non-ferrous metals such as aluminum, zinc, nickel, and copper, and their alloys. Other metals that can be protected from corrosion by the present invention are also contemplated. Such metal surfaces may be part of downhole piping, downhole tools, and the like.

To facilitate a better understanding of the present invention, the following examples of certain aspects of some embodiments are given. In no way should the following examples be read to limit, or define, the entire scope of the invention.

EXAMPLES

Shown in Table 1 are corrosion inhibitor formulations containing cinnamaldehyde and a constrained diamine. The formulation components are in weight %.

All weight loss tests were performed in Hastelloy B autoclaves. A pre-weighed corrosion coupon cut from N80 steel pipe, with a surface area of approximately 4.4 in$^2$, was immersed in 100 mL of a 15% by weight inhibited hydrochloric acid solution. The hydrochloric acid solution was inhibited with the inhibitor formulations described in Table 1, and was prepared by addition of the inhibitor formulation to de-ionized water, followed by addition of concentrated HCl necessary give the final wt % acid. HII-600 intensifier was added after the concentrated HCl addition, when used, followed by the SCA-130 scavenger and anti-cracker. Additive volumes were subtracted from the water volume to determine a final volume of 100 mL fluid. All tests were conducted under static conditions and pressurized first with 100 psi H$_2$S, if the test was run sour, followed by pressurization to 1000 psi with nitrogen gas. At the completion of the three hour contact time the coupon was removed from the acid solution, cleaned and weighed. The corrosion loss was then reported in lb/ft$^2$.

TABLE 1

Corrosion Inhibitor Formulations

| Formulation | CMA | Benz | TPP | DAMT | Formic | Diethylene Glycol | Witconate AOS | Aromox Apa-T | Tomadol 1-73B | IPA |
|---|---|---|---|---|---|---|---|---|---|---|
| 1 | 3.6 | 0.61 | 0.45 | None | 3.3 | 0.88 | 0.40 | 0.09 | 0.19 | 0.42 |
| 2 | 3.6 | 0.61 | 0.45 | 0.082 | 3.3 | 0.88 | 0.36 | 0.09 | 0.19 | 0.42 |
| 3 | 3.6 | 0.61 | 0.45 | 0.049 | 3.3 | 0.85 | 0.40 | 0.09 | 0.19 | 0.42 |

In Table 1, CMA=trans-cinnamaldehyde, Benz=benzaldehyde, TPP=triphenylphosphine, DAMT=2,4-diamino-6-methyl-1,3,5-triazine, Formic=88% formic acid, Witconate AOS=sodium olefin sulfonate surfactant from Akzo Nobel, Aromox APA-T=tallowalkylamidopropyl dimethylamine oxide from Akzo Nobel, Tomadol 1-73B=linear alcohol ethoxylate with an average 5.6 moles ethylene oxide from Air Products, IPA=isopropanol.

TABLE 2

Weight loss testing on N-80 steel, 3 hours

| Formulation | Concentration (vol %) | Temperature (° F.) | HII-600 (vol %) | SCA-130 (vol %) | H$_2$S (vol %) | Corrosion Loss (lb/ft$^2$) |
|---|---|---|---|---|---|---|
| 1 | 3 | 325 | 1.8 | 4 | 10% | 0.087 |
| 2 | 3 | 325 | 1.8 | 4 | 10% | 0.026 |
| 3 | 3 | 325 | 1.8 | 4 | 10% | 0.012 |
| 2 | 3 | 325 | 1.8 | 4 | — | 0.017 |
| 3 | 3 | 325 | 1.8 | 4 | — | 0.011 |
| 2 | 3 | 300 | — | 4 | 10% | 0.051 |
| 3 | 3 | 300 | — | 4 | 10% | 0.085 |
| 2 | 3 | 300 | — | 4 | — | 0.037 |
| 3 | 3 | 300 | — | 4 | — | 0.015 |

HII-600 intensifier is commercially available through Halliburton
SCA-130 is an H$_2$S scavenger and anti-cracking product commercially available through Halliburton.

As can be seen in Table 2, corrosion inhibitor Formulations 2 and 3 containing cinnamaldehyde and 2,4-diamino-6-methyl-1,3,5-triazine show low losses in both sweet and sour conditions, and perform adequately when used in conjunction with HII-600 intensification. Furthermore in a sour environment with HII-600 intensifier Formulation 1, that does not contain any 2,4-diamino-6-methyl-1,3,5-triazine, experiences a significantly higher corrosion loss. Losses of less than 0.05 lb/ft² are considered acceptable by the industry. Formulations 2 and 3 in comparison to 1 show improvement over cinnamaldehyde alone.

Weight loss tests for Table 3 were performed similar to those in Table 2. Cinnamaldehyde and the amine or thiol additive were added to the water phase followed by the concentrated acid. Additive volumes were subtracted from the water volume. All tests were conducted under static conditions pressurized to 1000 psi with nitrogen gas. At the completion of the three hour contact time the coupon was removed from the acid solution, cleaned and weighed. The corrosion loss was then reported in lb/ft².

TABLE 3

Weight loss tests performed in 15% HCl, 300° F., 1000 psi, 3 hours, N-80 steel

| Test No. | Cinnamaldehyde | mol | Amine/Thiol | mol | Constrained Ring Structure | Corrosion Loss lb/ft² |
|---|---|---|---|---|---|---|
| 1 | 2.0 vol % | 0.015 | 1,3-diaminopropane | 0.02 | N | 0.652 |
| 2 | 2.0 vol % | 0.015 | 1,4-diaminobutane | 0.02 | N | 0.676 |
| 3 | 2.0 vol % | 0.015 | ethanolamine | 0.02 | N | 0.765 |
| 4 | 2.0 vol % | 0.015 | thioglycolic acid | 0.02 | N | 0.745 |
| 5 | 2.0 vol % | 0.015 | 2,5-diaminotoluene sulfate | 0.02 | Y | 0.149 |
| 6 | 2.0 vol % | 0.015 | 4-methyl-m-phenylenediamine (4,4-diaminotoluene) | 0.02 | Y | 0.051 |
| 7 | 2.0 vol % | 0.015 | 2,6-diaminopyridine | 0.02 | Y | 0.494 |
| 8 | 2.0 vol % | 0.015 | 2,4-diamino-6-methyl-1,3,5-triazine | 0.02 | Y | 0.029 |
| 9 | 2.0 vol % | 0.015 | 1,4-diamine-6-phenyl-1,3,5-triazine | 0.02 | Y | 0.025 |

Shown in Table 3 is data corresponding to weight loss corrosion tests of cinnamaldehyde with unconstrained diamines, amine and thiol versus diamine-functionalized ring structures. Table 3 shows the weight loss testing performed with unconstrained diamines, amines, and thiols versus diamines that are functional groups off of an aromatic ring, i.e., constrained diamines. An unconstrained diamine can react 1:1 with cinnamaldehyde, through one or both amines; it can also react with two cinnamaldehyde molecules, forming a larger inhibitor molecule. However, we believe this is less likely without the fixed geometry of the preferred compounds. In some instances, at this point in time, we believe that diamines and dithiols that are functional groups off an aromatic ring, are forced to react 1:2 with cinnamaldehyde, resulting in a better inhibiting molecule. With a corrosion loss limit of 0.05 lb/ft², the unconstrained diamines and the amine and thiol gave no corrosion protection under the conditions tested. With the constrained geometries, all corrosion losses showed improvements, with several passing values. It is believed that the differences in corrosion inhibition between molecules such as 2,4-diamino-6-methyl-1,3,5-triazine and 2,4-diamino-6-phenyl-1,3,5-triazine may be due to differences in packing at the surface. In addition, it is possible that the cinnamaldehyde further polymerizes through the double bond adjacent the carbonyl further increasing the surface coverage of the molecule. It is also possible that in lower concentrations that the diamines and dithiols serve more as a crosslinker between adjacent cinnamaldehyde polymers or oligomers. In fact, the addition of very low levels of 2,4-diamino-6-methyl-1,3,5-triazine has proven effective in inhibitor formulations.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "about a to about b," or, equivalently, "approximately a to b," or, equivalently, "approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method comprising:
   contacting a metal surface with an acidic fluid comprising a corrosion inhibitor that comprises a reaction product formed from a direct or an indirect reaction of an aldehyde with a thiol functionalized ring structure wherein only a thioether bond is formed in the reaction product; and, wherein the aldehyde is selected from the group consisting of 2-hydroxynapthaldehyde, 7-phenyl-2,4,6-heptatrienal, crotonaldehyde, 2-hexenal, 2-heptenal, 2-octenal; 2-nonenal, 2-decenal, 2-undecenal, 2-dodecenal, 2,4-hexadienal, 2,4-heptadienal, 2,4-octadienal, 2,4-nonadienal, 2,4-decadienal, 2,4-undecadienal, 2,4-dodecadienal, 2,6-dodecadienal, citral, 1-formyl-[2-(2 methylvinyl)]-2-n-octylethylene, cinnamaldehyde, dicinnamaldehyde, p-hydroxycinnamaldehyde, p-methylcinnamaldehyde, p-ethylcinnamaldehyde, p-methoxycinnamaldehyde, p-dimethylaminocinnamaldehyde, p-diethylaminocinnamaldehyde, p-nitrocinnamaldehyde, o-nitrocinnamaldehyde, o-allyloxycinnamaldehyde, 4-(3-propenal)cinnamaldehyde, p-sodium sulfocinnamaldehyde, p-trimethylammoniumcinnamaldehyde sulfate, p-trimethylammoniumcinnamaldehyde o-methylsulfate, p-thiocyanocinnamaldehyde, p-(S-acetyl)thiocinnamaldehyde, p-(S—N,N dimethylcarbamoylthio)cinnamaldehyde, p-chlorocinnamaldehyde, 5-phenyl-2,4-pentadienal, 5-(p-methoxyphenyl)-2,4-pentadienal, 2,3-diphenylacrolein, 3,3-diphenylacrolein, α-methylcinnamaldehyde, β-methylcinnamaldehyde, α-chlorocinnamaldehyde, α-bromocinnamaldehyde, α-butylcinnamaldehyde, α-amylcinnamaldehyde, α-hexylcinnamaldehyde, 2-(p-methylbenzylidine)decanal, α-bromo-p-cyanocinnamaldehyde, α-ethyl-p-methylcinnamaldehyde, p-methyl-α-pentylcinnamaldehyde, 3,4-dimethoxy-α-methylcinnamaldehyde, α-[(4-methylphenyl)methylene]benzeneacetaldehyde, α-(hydroxymethylene)-4-methylbenzylacetaldehyde, 4-chloro-α-(hydroxymethylene)benzeneacetaldehyde, α-nonylidenebenzeneacetaldehyde, and combinations thereof.

2. The method of claim 1 wherein the corrosion inhibitor comprises at least one dithiol selected from the group consisting of 2,5-dimercapto-1,3,4-thiadiazole, dipotassium 2,5-dimercapto-1,3,4-thiadiazole salt, 1,3-benzenedithiol, and combinations thereof.

3. The method of claim 1 wherein the corrosion inhibitor further comprises at least one diamine selected from the group consisting of 3,4-diaminofuran, 2,4-diamino-6-phenyl-1,3,5-triazine, 2,4-diamino-6-methyl-1,3,5-triazine, 2,4-diamino-6,-hydroxy-1,3,5-triazine, 2,4-diamino-6-chloro-1,3,5-triazine, 2,5-diaminotoluene, 2,6-diamino pyridine, 2,6-diaminotoluene, 2,4-diaminotoluene, m-phenylenediamine, p-phenylenediamine, 4-methyl-m-phenylenediamine, 2,5-diaminotoluene sulfate, 2-methyl-1,3-benzenediamine, 5-chloro-1,3-phenylenediamine, 2,4,6-trimethyl-1,3-benzenediamine, 3,5-diaminobenzoic acid, 3-nitro-1,2-benzenediamine, 2-nitro-1,2-benzenediamine, 1,3-benzenediamine, 4-nitro-1,2-benzenediamine, 3-nitro-1,3-phenylenediamine, 2',4'-diaminoacetanilide, N-(3-aminophenyl)butanamide, 2,4-diaminobenzenesulfonic acid, 4-ethoxy-1,3-phenylenediamine2HCl, 2,4-bis(butylamino)-3-oxo-1-cyclobutenylium-1-olate, 2,4-bis(3-benzamidopropylamino)-3-oxo-1-cyclobutenylium-1-olate, 4-imino-5-methyl-2-nitramino-4H-imidazole, 2,5-diacetamido-1,3,4-thiadiazole, 5-amino-1,3,3-trimethylcyclohexanemethylamine, and combinations thereof.

4. The method of claim 1 wherein the metal surface is located within a well bore that penetrates a subterranean formation.

5. The method of claim 4 wherein the subterranean formation comprises hydrogen sulfide.

6. The method of claim 1 wherein the fluid comprises a gelled acid or a foamed acid.

7. The method of claim 1 wherein the fluid is introduced into a subterranean formation as part of an acidizing treatment.

8. The method of claim 1 wherein the acid comprises at least one acid selected from the group consisting of hydrochloric acid, hydrofluoric acid, an organic acid, a mineral acid, formic acid, acetic acid, citric acid, glycolic acid, hydroxyacetic acid, lactic acid, 3-hydroxypropionic acid, carbonic acid, ethylenediaminetetraacetic acid, and combinations thereof.

9. The method of claim 1 wherein the corrosion inhibitor comprises at least one compound selected from the group consisting of a cinnamaldehyde compound, an acetylenic compound, a condensation reaction product, and combinations thereof.

10. The method of claim 1 wherein the aldehyde and thiol functionalized ringed compound are pre-reacted before addition to the acidic fluid.

11. A method comprising:
introducing an acidic fluid into a well bore penetrating a subterranean formation, wherein the acidic fluid comprises an aqueous-base fluid, an acid, and a corrosion inhibitor that comprises a reaction product formed from a direct or an indirect reaction of an aldehyde with a thiol functionalized ring structure wherein only a thioether bond is formed in the reaction product; wherein the aldehyde is selected from the group consisting of 2-hydroxynapthaldehyde, 7-phenyl-2,4,6-heptatrienal, crotonaldehyde, 2-hexenal, 2-heptenal, 2-octenal; 2-nonenal, 2-decenal, 2-undecenal, 2-dodecenal, 2,4-hexadienal, 2,4-heptadienal, 2,4-octadienal, 2,4-nonadienal, 2,4-decadienal, 2,4-undecadienal, 2,4-dodecadienal, 2,6-dodecadienal, citral, 1-formyl-[2-(2 methylvinyl)]-2-n-octylethylene, cinnamaldehyde, dicinnamaldehyde, p-hydroxycinnamaldehyde, p-methylcinnamaldehyde, p-ethylcinnamaldehyde, p-methoxycinnamaldehyde, p-di methylaminocinnamaldehyde, p-diethylaminocinnamaldehyde, p-nitrocinnamaldehyde, o-nitrocinnamaldehyde, o-allyloxycinnamaldehyde, 4-(3-propenal)cinnamaldehyde, p-sodium sulfocinnamaldehyde, p-trimethylammoniumcinnamaldehyde sulfate, p-trimethylammoniumcinnamaldehyde o-methylsulfate, p-thiocyanocinnamaldehyde, p-(S-acetyl)thiocinnamaldehyde, p-(S—N,N dimethylcarbamoylthio)cinnamaldehyde, p-chlorocinnamaldehyde, 5-phenyl-2,4-pentadienal, 5-(p-methoxyphenyl)-2,4-pentadienal, 2,3-diphenylacrolein, 3,3-diphenylacrolein, α-methylcinnamaldehyde, β-methylcinnamaldehyde, α-chlorocinnamaldehyde, α-bromocinnamaldehyde, α-butylcinnamaldehyde, α-amylcinnamaldehyde, α-hexylcinnamaldehyde, 2-(p-methylbenzylidine)decanal, α-bromo-p-cyanocinnamaldehyde, α-ethyl-p-methylcinnamaldehyde, p-methyl-α-pentylcinnamaldehyde, 3,4-dimethoxy-α-methylcinnamaldehyde, α-[(4-methylphenyl)methylene]benzeneacetaldehyde, α-(hydroxymethylene)-4-methylbenzylacetaldehyde, 4-chloro-α-(hydroxymethylene)benzeneacetaldehyde, α-nonylidenebenzeneacetaldehyde, and combinations thereof; and,
wherein the acidic fluid contacts a metal surface within the well bore.

12. The method of claim 11 wherein the corrosion inhibitor comprises at least one dithiol selected from the group consisting of 2,5-dimercapto-1,3,4-thiadiazole, dipotassium 2,5-dimercapto-1,3,4-thiadiazole salt, 1,3-benzenedithiol, and combinations thereof.

13. The method of claim 11 wherein the corrosion inhibitor further comprises at least one diamine selected from the group consisting of 3,4-diaminofuran, 2,4-diamino-6-phenyl-1,3,5-triazine, 2,4-diamino-6-methyl-1,3,5-triazine, 2,4-diamino-6-hydroxy-1,3,5-triazine, 2,4-diamino-6-chloro-1,3,5-triazine, 2,5-diaminotoluene, 2,6-diaminopyridine, 2,6-diaminotoluene, 2,4-diaminotoluene, m-phenylenediamine, p-phenylenediamine, 4-methyl-m-phenylenediamine, 2,5-diaminotoluene sulfate, 2-methyl-1,3-benzenediamine, 5-chloro-1,3-phenylenediamine, 2,4,6-trimethyl-1,3-benzenediamine, 3,5-diaminobenzoic acid, 3-nitro-1,2-benzenediamine, 2-nitro-1,2-benzenediamine, 1,3-benzenediamine, 4-nitro-1,2-benzenediamine, 3-nitro-1,3-phenylenediamine, 2',4'-diaminoacetanilide, N-(3-aminophenyl)butanamide, 2,4-diaminobenzenesulfonic acid, 4-ethoxy-1,3-phenylenediamine2HCl, 2,4-bis(butylamino)-3-oxo-1-cyclobutenylium-1-olate, 2,4-bis(3-benzamidopropylamino)-3-oxo-1-cyclobutenylium-1-olate, 4-imino-5-methyl-2-nitramino-4H-imidazole, 2,5-diacetamido-1,3,4-thiadiazole, 5-amino-1,3,3-trimethylcyclohexanemethylamine, and combinations thereof.

14. The method of claim 11 wherein the acidic fluid is introduced into the well bore as part of an acidizing treatment.

15. A method comprising:

providing an acidic fluid comprising an aqueous-base fluid, an acid, and a corrosion inhibitor that comprises a reaction product formed from a direct or an indirect reaction of an aldehyde with a thiol functionalized ring structure wherein only a thioether bond is formed in the reaction product wherein the aldehyde is selected from the group consisting of 2-hydroxynapthaldehyde, 7-phenyl-2,4,6-heptatrienal, crotonaldehyde, 2-hexenal, 2-heptenal, 2-octenal; 2-nonenal, 2-decenal, 2-undecenal, 2-dodecenal, 2,4-hexadienal, 2,4-heptadienal, 2,4-octadienal, 2,4-nonadienal, 2,4-decadienal, 2,4-undecadienal, 2,4-dodecadienal, 2,6-dodecadienal, citral, 1-formyl-[2-(2 methylvinyl)]-2-n-octylethylene, cinnamaldehyde, dicinnamaldehyde, p-hydroxycinnamaldehyde, p-methylcinnamaldehyde, p-ethylcinnamaldehyde, p-methoxycinnamaldehyde, p-dimethylaminocinnamaldehyde, p-diethylaminocinnamaldehyde, p-nitrocinnamaldehyde, o-nitrocinnamaldehyde, o-allyloxycinnamaldehyde, 4-(3-propenal)cinnamaldehyde, p-sodium sulfocinnamaldehyde, p-trimethylammoniumcinnamaldehyde sulfate, p-trimethylammoniumcinnamaldehyde o-methylsulfate, p-thiocyanocinnamaldehyde, p-(S-acetyl)thiocinnamaldehyde, p-(S—N,N dimethylcarbamoylthio)cinnamaldehyde, p-chlorocinnamaldehyde, 5-phenyl-2,4-pentadienal, 5-(p-methoxyphenyl)-2,4-pentadienal, 2,3-diphenylacrolein, 3,3-diphenylacrolein, α-methylcinnamaldehyde, β-methylcinnamaldehyde, α-chlorocinnamaldehyde, α-bromocinnamaldehyde, α-butylcinnamaldehyde, α-amylcinnamaldehyde, α-hexylcinnamaldehyde, 2-(p-methylbenzylidine)decanal, α-bromo-p-cyanocinnamaldehyde, α-ethyl-p-methylcinnamaldehyde, p-methyl-α-pentylcinnamaldehyde, 3,4-dimethoxy-α-methylcinnamaldehyde, α-[(4-methylphenyl)methylene]benzeneacetaldehyde, α-(hydroxymethylene)-4-methylbenzylacetaldehyde, 4-chloro-α-(hydroxymethylene)benzeneacetaldehyde, α-nonylidenebenzeneacetaldehyde, and combinations thereof; and, placing the acidic fluid in a well bore penetrating a subterranean formation such that the acidic fluid contacts a metal surface in the well bore.

16. The method of claim 15 wherein the corrosion inhibitor comprises at least one dithiol selected from the group consisting of 2,5-dimercapto-1,3,4-thiadiazole, dipotassium 2,5-dimercapto-1,3,4-thiadiazolesalt, 1,3-benzenedithiol, and combinations thereof.

17. The method of claim 15 wherein the corrosion inhibitor further comprises at least one diamine selected from the group consisting of 3,4-diaminofuran, 2,4-diamino-6-phenyl-1,3,5-triazine, 2,4-diamino-6-methyl-1,3,5-triazine, 2,4-diamino-6-hydroxy-1,3,5-triazine, 2,4-diamino-6-chloro-1,3,5-triazine, 2,5-diaminotoluene, 2,6-diaminopyridine, 2,6-diaminotoluene, 2,4-diaminotoluene, m-phenylenediamine, p-phenylenediamine, 4-methyl-m-phenylenediamine, 2,5-diaminotoluene sulfate, 2-methyl-1,3-benzenediamine, 5-chioro-1,3-phenylenediamine, 2,4,6-trimethyl-1,3-benzenediamine, 3,5-diaminobenzoic acid, 3-nitro-1,2-benzenediamine, 2-nitro-1,2-benzenediamine, 1,3-benzenediamine, 4-nitro-1,2-benzenediamine, 3-nitro-1,3-phenylenediamine, 2',4'-diaminoacetanilide, N-(3-aminophenyl)butanamide, 2,4-diaminobenzenesulfonic acid, 4-ethoxy-1,3-phenylenediamine2HCl, 2,4-bis(butylamino)-3-oxo-1-cyclobutenylium-1-olate, 2,4-bis(3-benzamidopropylamino)-3-oxo-1-cyclobutenylium-1-olate, 4-imino-5-methyl-2-nitramino-4H-imidazole, 2,5-diacetamido-1,3,4-thiadiazole, 5-amino-1,3,3-trimethylcyclohexanemethylamine and combinations thereof.

18. The method of claim 15 wherein the acidic fluid is introduced into the well bore as part of an acidizing treatment.

19. The method of claim 15 wherein the acidic fluid is foamed.

* * * * *